US011479418B2

(12) United States Patent
Zatopek

(10) Patent No.: US 11,479,418 B2
(45) Date of Patent: Oct. 25, 2022

(54) DETECTION AND REMOVAL OF UNSTABLE PARCEL MAIL FROM AN AUTOMATED PROCESSING STREAM

(71) Applicant: Siemens Logistics LLC, DFW Airport, TX (US)

(72) Inventor: John M. Zatopek, Arlington, TX (US)

(73) Assignee: Körber Supply Chain LLC, DFW Airport, TX (US)

( * ) Notice: Subject to any disclaimer, the term of this patent is extended or adjusted under 35 U.S.C. 154(b) by 50 days.

(21) Appl. No.: 17/054,328

(22) PCT Filed: May 14, 2019

(86) PCT No.: PCT/US2019/032088
§ 371 (c)(1),
(2) Date: Nov. 10, 2020

(87) PCT Pub. No.: WO2019/222128
PCT Pub. Date: Nov. 21, 2019

(65) Prior Publication Data
US 2022/0041379 A1 Feb. 10, 2022

Related U.S. Application Data

(60) Provisional application No. 62/672,163, filed on May 16, 2018.

(51) Int. Cl.
*B07C 5/02* (2006.01)
*B65G 47/256* (2006.01)
(Continued)

(52) U.S. Cl.
CPC ............. *B65G 47/256* (2013.01); *B07C 5/02* (2013.01); *B07C 5/10* (2013.01); *B07C 5/3422* (2013.01);
(Continued)

(58) Field of Classification Search
CPC .... B07C 1/02; B07C 1/04; B07C 1/18; B07C 1/20; B07C 5/02; B07C 5/10;
(Continued)

(56) References Cited

U.S. PATENT DOCUMENTS 4,819,784 A * 4/1989 Sticht ........................ B07C 5/02
209/939
5,165,520 A * 11/1992 Herve ........................ B07C 5/02
198/444
(Continued)

FOREIGN PATENT DOCUMENTS

DE 102015005443 A1 12/2016
EP 2944591 A1 11/2015
WO 0066280 A2 11/2000

OTHER PUBLICATIONS

PCT International Search Report and Written Opinion of International Searching Authority dated Aug. 9, 2019 corresponding to PCT International Application No. PCT/US2019/032088 filed May 14, 2019.

*Primary Examiner* — Joseph C Rodriguez

(57) ABSTRACT

A system for removing unstable articles from an automated processing stream includes an automated processing stream with a plurality of processing units including a flow diverter and configured to carry a stream of articles, a vision system, and a control system interfacing with the automated processing stream and the vision system, wherein the vision system is configured to detect positions of an article and to transmit position data to the control system, and wherein the control system is configured, through operation of a processor, to determine an expected position of the article based on a first detected position, compare the expected position to a second detected position of the article, determine a deviation
(Continued)

of the second detected position from the expected position, and control the flow diverter to divert the article based on the deviation.

14 Claims, 2 Drawing Sheets

(51) Int. Cl.
    *B07C 5/10* (2006.01)
    *B07C 5/342* (2006.01)
    *B65G 43/08* (2006.01)

(52) U.S. Cl.
    CPC ...... *B65G 43/08* (2013.01); *B65G 2201/0285* (2013.01); *B65G 2203/0225* (2013.01); *B65G 2203/041* (2013.01)

(58) Field of Classification Search
    CPC .... B07C 5/3422; B65G 43/08; B65G 47/256; B65G 2201/0285; B65G 2203/0225
    See application file for complete search history.

(56) References Cited

U.S. PATENT DOCUMENTS

| | | | | |
|---|---|---|---|---|
| 5,186,303 | A * | 2/1993 | Seto | G05B 19/4015 |
| | | | | 198/434 |
| 5,314,055 | A * | 5/1994 | Gordon | G05B 19/4182 |
| | | | | 198/395 |
| 6,056,108 | A * | 5/2000 | Buchi | B25J 9/1697 |
| | | | | 198/395 |
| 10,781,053 | B1 * | 9/2020 | Zhao | B65G 15/24 |
| 2016/0354809 | A1 * | 12/2016 | Gruna | B07C 5/10 |
| 2020/0254490 | A1 * | 8/2020 | Lundahl | B07C 3/14 |

* cited by examiner

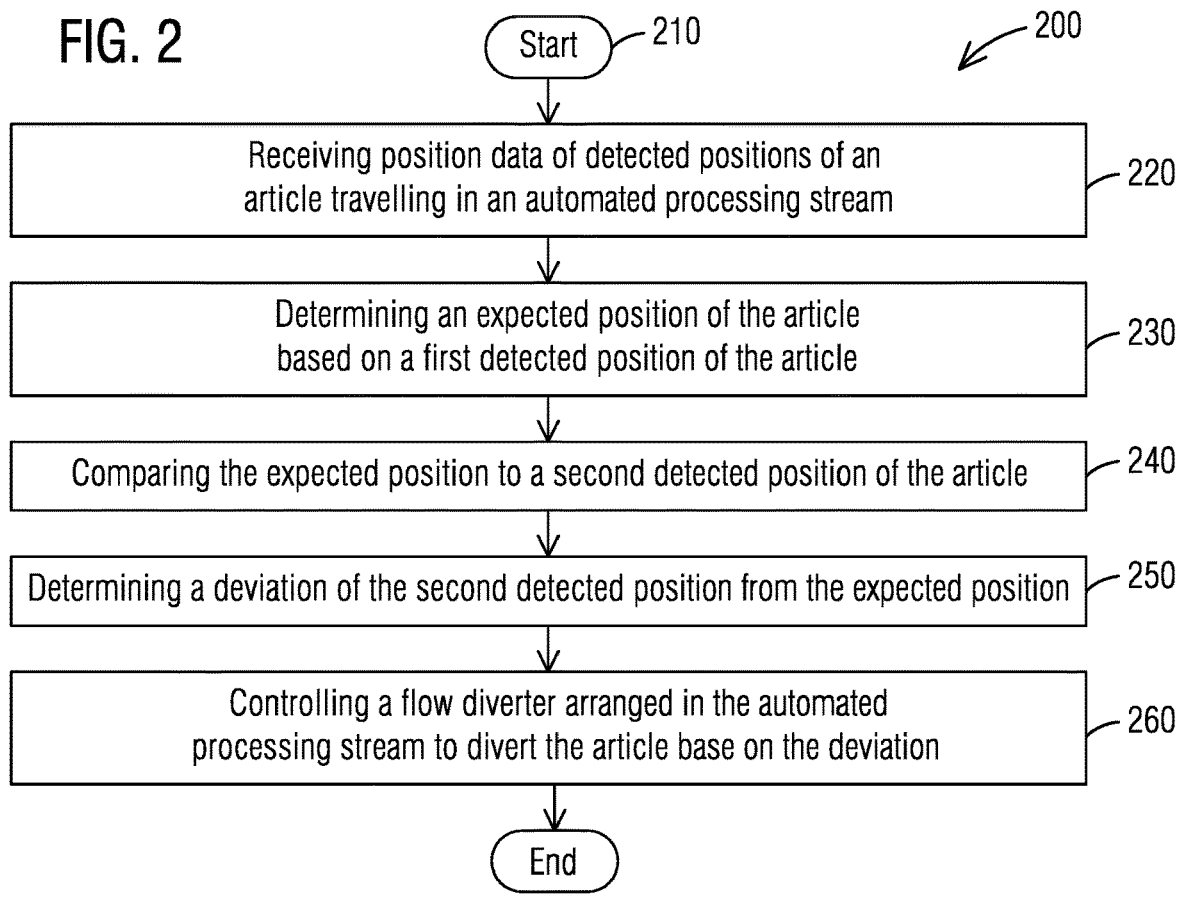
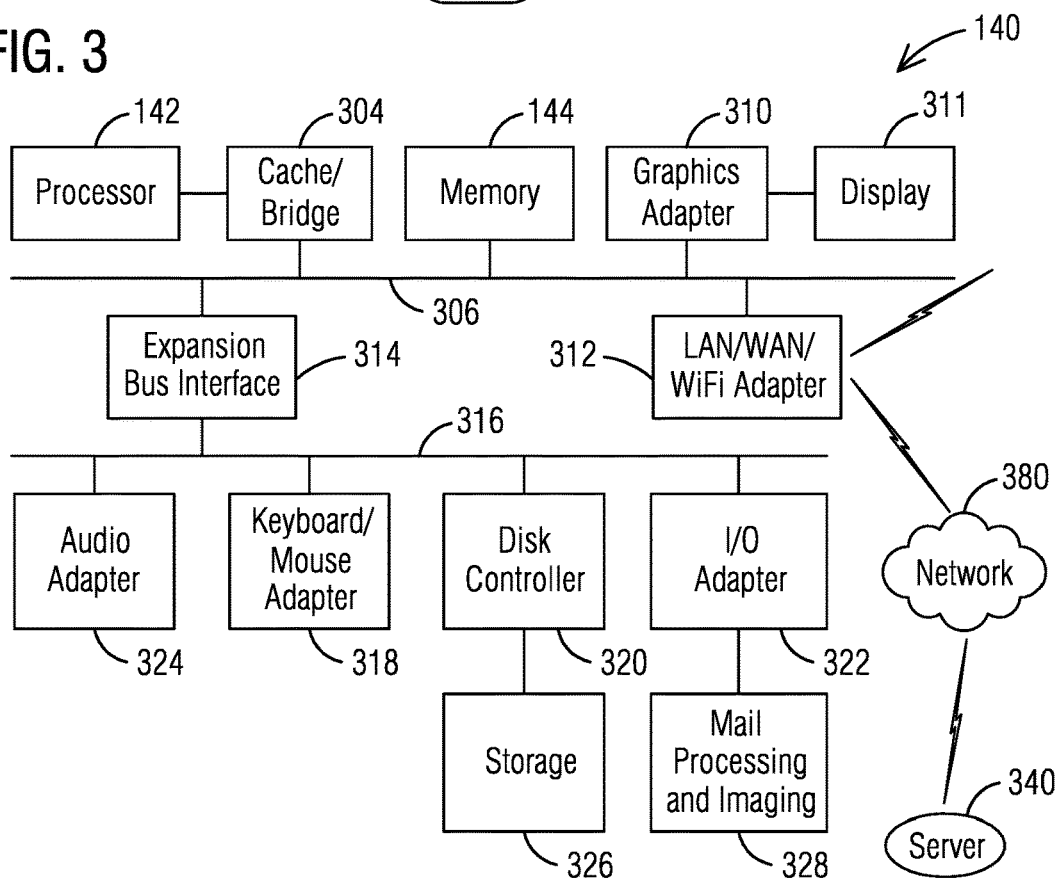

DETECTION AND REMOVAL OF UNSTABLE PARCEL MAIL FROM AN AUTOMATED PROCESSING STREAM

BACKGROUND

1. Field

Aspects of the present disclosure generally relate to automatic processing of articles, such as parcels and other items. Specifically, the present disclosure relates to detection and removal of unstable parcel mail from an automated processing stream to reduce jams, flyouts and mis-sorts.

2. Description of the Related Art

In mail processing and distribution centers incoming parcel mail is frequently a mix of boxes, polybags, large envelopes, paper bags, and padded envelopes. The boxes can be various shapes and sizes, even triangular in shape. The boxes can be made-up of cardboard, plastic, wood, and metal. The boxes' finish can be glossy smooth to rough. Stuffed envelopes, packets, or bags can come in varying shapes and sizes depending on their contents. The envelopes, packets, and bags material can be cardboard, plastic, or Tyvek®. When these items are overstuffed, they become very unstable and tend to rock. For example, Tyvek® material has a very low coefficient of friction (uf<0.2 on steel).

When the mix of parcels is dumped into an automated feed system in preparation for induction onto a sorting machine, these unstable parcels are likely to be difficult to process, often losing tracking, misbehaving during singulation, gapping, weighing, and scanning and ultimately stopping the system with a fault condition when they reach the automated induction lines, if not before. These fault conditions typically require a manual intervention to resolve, involving removal of the unstable parcel(s), system reset, and system restart. Even a small percentage of unstable parcels in the overall mix being processed can have a major impact of the sustained throughput of the overall infeed and sorting system. Currently unstable parcels are either manually identified and removed from the automation stream by a "groomer" or "tender" at the loading point into the infeed system or are simply left in the mix of parcels and allowed to enter the automation where they may cause jams, flyouts, or mis-sorts.

SUMMARY

A first aspect of the present disclosure provides a system for removing unstable articles from an automated processing stream comprising an automated processing stream comprising a plurality of processing units including a flow diverter and configured to carry a stream of articles, a vision system comprising at least one sensor, and a control system comprising at least one processor and interfacing with the automated processing stream and the vision system, wherein the vision system is configured to detect positions of an article and to transmit position data to the control system, and wherein the control system is configured, through operation of the at least one processor, to determine an expected position of the article based on a first detected position, compare the expected position to a second detected position of the article, determine a deviation of the second detected position from the expected position, and control the flow diverter to divert the article based on the deviation.

A second aspect of the present disclosure provides a method for removing unstable articles from an automated processing stream comprising, through operation of at least one processor in a control system configured via executable instructions included in at least one memory, receiving position data of detected positions of an article travelling in an automated processing stream, determining an expected position of the article based on a first detected position of the article, comparing the expected position to a second detected position of the article, determining a deviation of the second detected position from the expected position, and controlling a flow diverter arranged in the automated processing stream to divert the article based on the deviation.

A third aspect of the present disclosure provides a non-transitory computer readable medium comprising instructions that when executed by at least one processor to perform a method for removing unstable articles from an automated processing stream.

BRIEF DESCRIPTION OF THE DRAWINGS

FIG. 2 depicts a flow chart of a method for removing unstable articles from an automated processing stream in accordance with an exemplary embodiment of the present disclosure.

FIG. 3 depicts a block diagram of a control system of a system for removing articles from an automated processing stream in accordance with an exemplary embodiment of the present disclosure.

DETAILED DESCRIPTION

Figure 1:
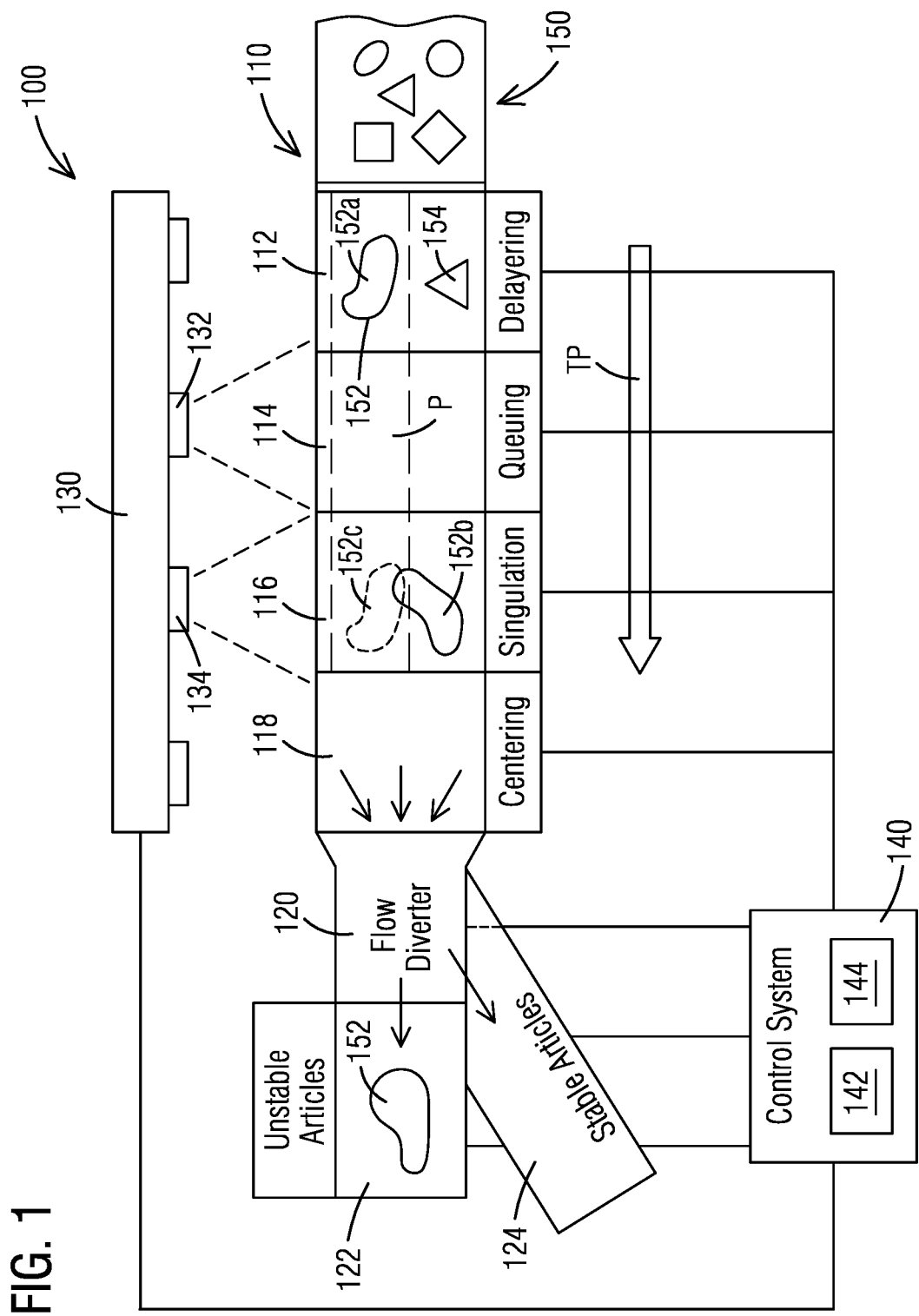
FIG. 1 depicts a schematic view of system for removing unstable articles from an automated processing stream in accordance with an exemplary embodiment of the present disclosure.

To facilitate an understanding of embodiments, principles, and features of the present disclosure, they are explained hereinafter with reference to implementation in illustrative embodiments. In particular, they are described in the context of being a system and a method for detecting and removing unstable articles, such as for example parcels, packages or other mail items, from an automated processing stream. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

FIG. 1 depicts a schematic view of a system 100 for removing unstable articles from an automated processing stream in accordance with an exemplary embodiment of the present disclosure.

It is highly desirable to detect and remove unstable articles as early in an automated processing stream as possible in a manner that does not negatively impact system performance. Such articles are for example parcels, packages or other mail items. In systems where articles, e.g., parcels, are unloaded into the feed system in bulk from bags, containers, gaylords, dumpers, or via discharge from bulk feed conveyors, a typical subsequent sequence of operations is delayering, singulation, aligning, gapping, scanning, weighing, and distributing to one or more inductions on an automatic sorting machine.

The table below shows examples for stable and unstable articles, specifically parcels:

| Qualifiers (stable parcels) | Detractors (unstable parcels) |
|---|---|
| Rectangular parcel shape (90-degree corners) | Oval parcel shape (or significantly rounded corners) |
| Parcel path of conveyance tracks with Motion Control predictions | Parcel path of conveyance fails to track with Motion Control predictions |
| Rotation does not fluctuate during straight line conveyance operations | Rotation fluctuates during straight line conveyance operations |
| Parcel shape/area remains constant during conveyance | Parcel shape/area fluctuates during conveyance |
| Parcel shape is within Min/Max Length & Width parameters | Parcel shape is outside Min/Max Length & Width parameters |
| Parcel separates from adjacent parcels during singulation operation | Parcel will not separate from adjacent parcels |

In an exemplary embodiment of the present disclosure, the system 100 includes an automated processing stream 110 comprising a plurality of processing units and configured to carry a stream of articles 150. Typically, the stream of articles 150 comprises parcels or other mail items as an incoming stream for the system 100. In operation of the system 100, bulk stacks of parcels or other mail items are loaded, either by human operators or automated by machines, onto an infeed conveyor belt. The automated processing stream 110 defines a transport path illustrated by arrow TP. The stream of articles 150 travels along the transport path TP.

The stream of articles 150 typically comprises parcels or other mail items in various shapes and sizes, including for example boxes, polybags, large envelopes, paper bags, and padded envelopes etc. The boxes can be made-up of cardboard, plastic, wood, and metal. The boxes' finish can be glossy smooth to rough. Stuffed envelopes, packets, or bags can come in varying shapes and sizes depending on their contents. The envelopes, packets, and bags material can be cardboard, plastic, or Tyvek®. When these items are overstuffed, they become very unstable and tend to rock.

The automated processing stream 110 comprises for example a subsequent sequence of operations including, but not limited to, delayering, singulating, aligning, gapping, scanning, weighing, and distributing to one or more inductions on an automatic sorting machine. As FIG. 1 illustrates, the exemplary processing stream 110 includes a delayering unit 112, a queuing unit 114, a singulation unit 116, a centering merge 118 and a flow diverter 120.

The delayering unit 112 includes process step 'delayering' which may also be known as 'delaminating' and refers to (re-)arrangement of a disordered stream of articles with respect to a three-dimensional space. After delayering or delamination, the articles are not stacked one on top of the other, but may still be arranged in a two-dimensional space, for example side by side. The articles are queued, e.g. lined up, utilizing the queuing unit 114, before the articles are singulated via the singulation unit 116. The process step 'singulation' refers to the (re-)arrangement of a disordered flow or stream of articles with respect to a two-dimensional space into one or more single-file output streams (absence of side-by-side parcels). The centering merge 118 comprises process step centering and merging of the singulated articles within the processing stream 110. It should be noted that the processing stream 110 may comprise more or less than the described operations/units. For example, processing stream 110 may not comprise a queuing unit 114, or processing stream 110 may instead or additionally comprise process step 'gapping'.

The automated processing stream 110 further comprises a flow diverter 120 for diverting the processing stream 110 into first sub-stream 122 and second sub-stream 124. The flow diverter 120 is arranged after the singulation unit 116 with respect to the transport path TP of the automated processing stream 110.

In an example, the singulation unit 116 comprises multiple variable-speed belt actuators, each controlled by a servomotor. The actuators move independently, and each article (parcel) may be manipulated to optimize speed and orientation for singulation. The servomotors accelerate and decelerate each belt to pull parcels away from the incoming flow in a sequence determined by a control algorithm stored in control system 140 and monitored by a vision system 130. Moving parts of machines in a controlled manner, such as the servomotors accelerating and decelerating the belt actuators, may also be referred to as motion control which is handled/performed by the control system 140. The articles (parcels) may be aligned lengthwise or crosswise in order to optimize gaps and to move through the downstream system more smoothly. The delayering unit 112 and queuing unit 114 may also comprise belt actuators for processing of the stream of articles. In another example, the delayering unit 112 may comprise multiple individually and selectively controlled rollers or short conveyor belt segments, controlled by control system 140.

The system 100 further comprises vision system 130 comprising at least one sensor 130, and the control system 140 comprising at least one processor 142 and interfacing with the automated processing stream 110 and the vision system 130.

In an exemplary embodiment, the vision system 130 comprises at least one image sensor. In our example, the vision system comprises at least two image sensors 132, 134, wherein each sensor 132, 134 is for example a digital camera, for example down-looking cameras. The sensors 132, 134, e.g., digital cameras, are arranged so that they cover essentially a whole surface, i.e. length and width, of the processing stream 110, specifically processing units 112, 114, 116, 118, to detect locations/positions of articles of the stream of articles 150 travelling in the processing stream 110. In an example, the image sensors 132, 134 are arranged and configured to detect a position and/or size and/or orientation of each of the articles and to transmit corresponding data, e.g. position data and/or size data and/or orientation data to the control system 140. It should be noted that the vision system 130 may comprise more or less than two image sensors, and that instead of digital cameras, other devices capable of providing position, size and/or orientation data may be utilized.

The control system 140 interfaces with the processing stream 110, specifically controls the processing units 112, 114, 116, 118, 120. The control system 140 is configured to receive data and information from the vision system 130 and to control the processing stream 110, specifically delayering unit 112, queuing unit 114 and singulation unit 116, based on data and information provided by the vision system 130. Data transmission between the vision system 130, the control system 140 and the processing units 112, 114, 116, 118 and 120 may be wired, for example via Ethernet cable, or may be wireless, for example via Internet (Wi-Fi).

At a point in the system 100 after which a significant majority of the article (parcel) stream 150 is in a single layer, for example after the delayering unit 116, an opportunity exists to track positions and outlines/profiles of individual articles utilizing the vision system 130, e.g., one or more down-looking cameras. By locating the vision system(s)

130, e.g., digital cameras, in the process path (transport path TP) where a significant majority of the individual parcels undergoes intentionally induced acceleration, deceleration, and/or changes in direction of travel, an iterative comparison of expected parcel position to actual parcel position is performed by the vision system 130 together with the control system 140 yielding strong detection of parcels that have slipped or tumbled or rocked while exposed to forces (acceleration, deceleration, changes in direction of travel) induced by the control system 140.

FIG. 1 illustrates exemplary parcel 152 travelling along the processing path TP in the processing stream 110. The parcel 152 is currently in queuing unit 114 side by side to another parcel 154. The parcels 152, 154 need to be accelerated or decelerated so that the parcels 152, 154 are arranged one after another and not side by side. For example, parcel 152 may be accelerated and parcel 154 decelerated or vice versa.

In our example, parcel 152 comprises first (current) detected position 152a, detected by the vision system 130 and corresponding position data being transmitted to the control system 140. In order to singulate the parcels 152, 154, parcel 152 is being accelerated, wherein the control system 140 determines (calculates) speed and direction of the article 152, for example via belt actuators or rollers of the queuing unit 114 and singulation unit 116, to accelerate (move forward) parcel 152 to an expected (calculated) position 152c.

The vision system 130 is configured to continuously detect the (actual) positions of the article 152 and to transmit position data of the article 152 to the control system 140. The control system 140 is configured, through operation of the at least one processor 142, to compare a second detected position 152b to the expected position 152c of the article 152, and to determine a deviation of the second detected position 152b from the expected position 152c.

As FIG. 1 illustrates, the parcel 152, while travelling, did not move forward and arrive at the expected position 152c, but at a second detected (actual) position 152b. As the parcel 152 did not arrive at the expected position 152c, the parcel 152 has slipped or tumbled or rocked while exposed to the acceleration induced by the control system 140, which means that the parcel 152 is unstable.

The vision system 130 and control system 140 detect and determine that the article 152 is not moving or travelling as intended, and flag or label the article 152 as unstable and remove the article 152 from the processing stream 110. For removal of the article 152, the control system 140 is configured to control the flow diverter 120 to divert the article 152 based on the deviation.

According to a further exemplary embodiment of the present disclosure, the control system 140 is configured to control the flow diverter 120 to divert the article 152 into the first sub-stream 122 when the article 152 deviates from the expected (calculated) position 152c. However, when the detected position 152b (substantially) corresponds to the expected position 152c, which means that the parcel 152 is stable and behaves as expected, the flow diverter 120 will divert the article 152 to the second sub-stream 124, controlled accordingly by the control system 140.

Removal of the parcel 152, deemed to exhibit enough evidence of being unstable, is performed after a significant majority of the parcel stream 110 has been singulated. The removal is affected via a straight-line path, sub-stream 122, to a reject outlet from the process automation without subjecting the unstable parcel 152 to any further acceleration, deceleration, and/or changes in direction of travel to ensure deterministic culling. The stable parcel flow may be steered or diverted to continue the normal path through the process automation via second sub-stream 124.

In order to determine whether the second detected position 152b deviates enough, outside an acceptable tolerance, from the expected position 152c to establish that the parcel 152 is unstable, it may be determined that the expected position 152c lies within a predefined path P of the article 152 in the automated processing stream 110. The predefined path P provides some tolerance to the expected position 152c. The tolerance may be chosen according to certain requirements or system boundaries. As long as the second detected position 152b of the parcel 152 lies within the predefined path P, the parcel 152 is considered stable. When the second detected position 152b lies outside the predefined path P, the parcel 152 is considered unstable.

The expected position 152c of the article 152 is determined or calculated with respect to a point in time based on a previous position 152a of the article 152 at a previous point in time. For example, article 152 is located at a first detected position 152a at a first point in time. Based on position 152a, the control system 140, using a control algorithm, calculates/determines position 152c and speed and direction of the article 152, for example via belt actuators of the singulation unit 116/queuing unit 114, to move the article 152c to expected position 152c. The vision system 130 continuously provides position data of the article 152 in order to track the article 152 and to provide feedback with respect to the position of the article 152 to the control system 140.

In addition to the iterative comparison of expected position 152c to actual position 152b, the vision system 130 may also perform iterative comparison of the article's outline (profile) to detect unexpected rotation or rocking. Note that in situations where an unstable parcel is rocking but not slipping, the profile or outline of the parcel as seen by the vision system 130 may vary enough due to the changing perspective to reliably detect an instability.

The system 100 for removing unstable articles, such as parcel 152, from an automation stream 110 eliminates reliance upon manual labor to identify and physically remove unstable articles. By monitoring reactions of each article, the process automation forces (acceleration, deceleration etc.) already being imposed during singulation, aligning, and/or gapping, integration of another functional block into the path of the automation stream is not required. Existing mail processing systems may already have a function for removal of oversize and/or overweight articles/parcels that may also be used to remove unstable articles/parcels, especially when considered in the context of equipment layouts for new system installations. The control system 140 comprises corresponding software/control algorithm(s) to perform the unstable parcel detection processes described herein. Acquisition or analysis of machine vision 3D images to identify unstable parcels is not required, although such technology may be used to potentially increase detection rate and reduce the error rate (false positives). Also, advanced robotics with parcel manipulation capability to remove unstable parcels are not required, although such technology may be used at significantly greater expense to perform this function.

Alternative solutions for unstable article detection may include designing a new parcel product dedicated to monitoring reactions of each parcel to forces intentionally imposed as they pass through, adding technology to acquire and analyze 3D images to identify unstable parcels, or adding advanced robotics technology with a 3D machine vision system and parcel manipulation capability to remove unstable parcels.

FIG. 2 depicts a flow chart of a method 200 for removing unstable articles from an automated processing stream 110 in accordance with an exemplary embodiment of the present disclosure. While the method 200 is described as a series of acts that are performed in a sequence, it is to be understood that the method 200 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 200 may start at 210 and may include an act 220 of receiving position data of detected positions 152a, 152b of an article 152 travelling in an automated processing stream 110. The method 200 may also include an act 230 of determining an expected position 152c of the article 152 based on a first detected position 152a of the article 152, and an act 240 of comparing the expected position 152c to a second detected position 152b of the article. Further, the method 200 may include an act 250 of determining a deviation of the second detected position 152b from the expected position 152c, and an act 260 of controlling a flow diverter 120 arranged in the automated processing stream 110 to divert the article 152 based on the deviation. At 270, the method 200 may end. It should be appreciated that this described method 200 may include additional acts and/or alternative acts corresponding to the features described with respect to the system 100 and control system 140 (see FIG. 1 and FIG. 3).

In an embodiment, the article 152 is diverted into a first sub-stream 122 by the flow diverter 120 when the second detected position 152b deviates from the expected position 152c of the article 152. However, when the second detected position 152b corresponds to the expected position 152c, the article 152 is diverted into a second sub-stream 124 by the flow diverter 120, controlled by the control system 140.

In another embodiment, the position data of the article 152 are continuously tracked by the vision system 130 in connection with the control system 140 and the act of comparing 240 includes iterative comparing of multiple detected positions to the expected position 152c and/or iterative comparison of an outline or profile of the article 152 to the expected position 152c to detect unexpected rotation or rocking.

It should be appreciated that acts associated with the above-described methodologies, features, and functions (other than any described manual acts) may be carried out by one or more data processing systems, such as for example control system 140 via operation of at least one processor 142. As used herein, a processor corresponds to any electronic device that is configured via hardware circuits, software, and/or firmware to process data. For example, processors described herein may correspond to one or more (or a combination) of a microprocessor, central processing unit (CPU) or any other integrated circuit (IC) or other type of circuit that is capable of processing data in a data processing system. As discussed previously, the processor 142 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the processor 142 with the executable instructions (e.g., software/firmware apps) loaded/installed into a memory 144 (volatile and/or non-volatile), which are currently being executed and/or are available to be executed by the processor 142 to cause the processor 142 to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

In addition, it should be understood, that reference to "a processor" may include multiple physical processors or cores that are configured to carry out the functions described herein. Further, it should be appreciated that a data processing system may also be referred to as a controller that is operative to control at least one operation.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C #, C++ or any other form of code that can be programmed/configured to cause at least one processor to carry out the acts and features described herein. Still further, results of the described/claimed processes or functions may be stored in a computer-readable medium, displayed on a display device, and/or the like FIG. 3 depicts a block diagram of a control system, herein also referred as a data processing system, in which an embodiment can be implemented, for example as a control system 140 for a system 100 for removing unstable articles from an automated processing stream 110 as described before and can be configured to perform processes as described herein.

In an exemplary embodiment, the control system 140 depicted includes processor 142 connected to a level two cache/bridge 304, which is connected in turn to a local system bus 306. Local system bus 306 may be, for example, a peripheral component interconnect (PCI) architecture bus. Also connected to local system bus 306 in the depicted example are a main memory 144 and a graphics adapter 310. The graphics adapter 310 may be connected to display 311.

Other peripherals, such as local area network (LAN)/wide area network (WAN)/Wireless (e.g., Wi-Fi) adapter 312, may also be connected to local system bus 306. Expansion bus interface 314 connects local system bus 306 to input/ output (I/O) bus 316. I/O bus 316 is connected to keyboard/mouse adapter 313, disk controller 320, and I/O adapter 322. Disk controller 320 can be connected to a storage 326, which can be any suitable machine usable or machine readable storage medium, including but not limited to non-volatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

I/O adapter 322 can be connected to mail processing and imaging devices 323, for example to image, scan, transport, label, address-process, sort, and otherwise processes the articles, such as the stream of articles 150, in accordance with the various embodiments described herein. Also connected to I/O bus 316 in the example shown is audio adapter 324, to which speakers (not shown) may be connected for playing sounds. Keyboard/mouse adapter 313 provides a connection for a pointing device (not shown), such as a mouse, trackball, track-pointer, etc.

Those of ordinary skill in the art will appreciate that the hardware depicted in FIG. 3 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

LAN/WAN/Wireless adapter 312 can be connected to a network 330 (not a part of data processing system 140), which can be any public or private data processing system network or combination of networks, as known to those of skill in the art, including the Internet. LAN/WAN/Wireless adapter 312 can also communicate with parcels A, B, C, D, E as described herein and perform other data processing system or server processes described herein. Data processing system 140 can communicate over network 330 with one or more server systems 340, which are also not part of data processing system 140, but can be implemented, for example, as separate data processing systems. A server system 340 can be, for example, a central server system at a central mail processing facility.

The invention claimed is:

1. A system for removing unstable articles from an automated processing stream comprising:
   an automated processing stream comprising a plurality of processing units including a flow diverter and configured to carry a stream of articles,
   a vision system comprising at least one sensor, and
   a control system comprising at least one processor and interfacing with the automated processing stream and the vision system,
   wherein the vision system is configured to detect positions of an article and to transmit position data to the control system, and
   wherein the control system is configured, through operation of the at least one processor, to
      determine an expected position of the article based on a first detected position,
      compare the expected position to a second detected position of the article,
      determine a deviation of the second detected position from the expected position, and
      control the flow diverter to divert the article based on the deviation,
   further comprising a first sub-stream and a second sub-stream, wherein the control system is configured to control the flow diverter
      to divert the article into the first sub-stream when the second detected position deviates from the expected position, diversion into the first sub-stream being affected via a straight-line path, and
      to divert the article into the second sub-stream when the second detected position corresponds to the expected position.

2. The system of claim 1, wherein the automated processing stream further comprises a singulation unit, and wherein the flow diverter is arranged after the singulation unit with respect to a transport path of the automated processing stream.

3. The system of claim 1, wherein the expected position of the article lies within a predefined path in the automated processing stream.

4. The system of claim 1, wherein the control system is configured to calculate the expected position of the article with respect to a point in time based on a previous position of the article at a previous point in time.

5. The system of claim 4, wherein the control system is configured to calculate the expected position based on speed and direction of the article travelling in the automated processing stream.

6. The system of claim 1, wherein the vision system comprises at least one image sensor.

7. The system of claim 6, wherein the at least one image sensor comprises at least one digital camera.

8. A method for removing unstable articles from an automated processing stream comprising:
   through operation of at least one processor in a control system configured via executable instructions included in at least one memory:
      receiving position data of detected positions of an article travelling in an automated processing stream,
      determining an expected position of the article based on a first detected position of the article,
      comparing the expected position to a second detected position of the article,
      determining a deviation of the second detected position from the expected position, and
      controlling a flow diverter arranged in the automated processing stream to divert the article based on the deviation,
   wherein the article is diverted into a first sub-stream when the second detected position deviates from the expected position of the article, diversion into the first sub-stream being affected via a straight-line path, and
   wherein the article is diverted into a second sub-stream when the second detected position corresponds to the expected position of the article.

9. The method of claim 8, wherein diversion of the article by the flow diverter occurs after singulation of the article.

10. The method of claim 8, wherein the position data of the article are continuously tracked, and the comparing includes iterative comparing of multiple detected positions to the expected position.

11. The method of claim 8, wherein the position data of the article are continuously tracked, and the comparing includes iterative comparing of an outline or profile of the article to the expected position to detect unexpected rotation or rocking.

12. A non-transitory computer readable medium comprising instructions that when executed by at least one processor perform a method for removing unstable articles from an automated processing stream, the method comprising:
- receiving position data of detected positions of an article travelling in an automated processing stream,
- determining an expected position of the article based on a first detected position of the article,
- comparing the expected position to a second detected position of the article,
- determining a deviation of the second detected position from the expected position, and
- controlling a flow diverter arranged in the automated processing stream to divert the article based on the deviation,
  - wherein the article is diverted into a first sub-stream when the second detected position deviates from the expected position of the article, diversion into the first sub-stream being affected via a straight-line path, and
  - wherein the article is diverted into a second sub-stream when the second detected position corresponds to the expected position of the article.

13. The non-transitory computer readable medium of claim 12, wherein diversion of the article by the flow diverter occurs after singulation of the article.

14. The non-transitory computer readable medium of claim 12, wherein the position data of the article are continuously tracked and the comparing includes iterative comparing of multiple detected positions to the expected position and/or iterative comparing of an outline or profile of the article to the expected position to detect unexpected rotation or rocking.

* * * * *